Aug. 5, 1924.

J. L. PHILLIPS

QUICK ADJUSTMENT CHUCK

Filed June 11, 1923

Inventor
Jas. L. Phillips.

By

Attorney

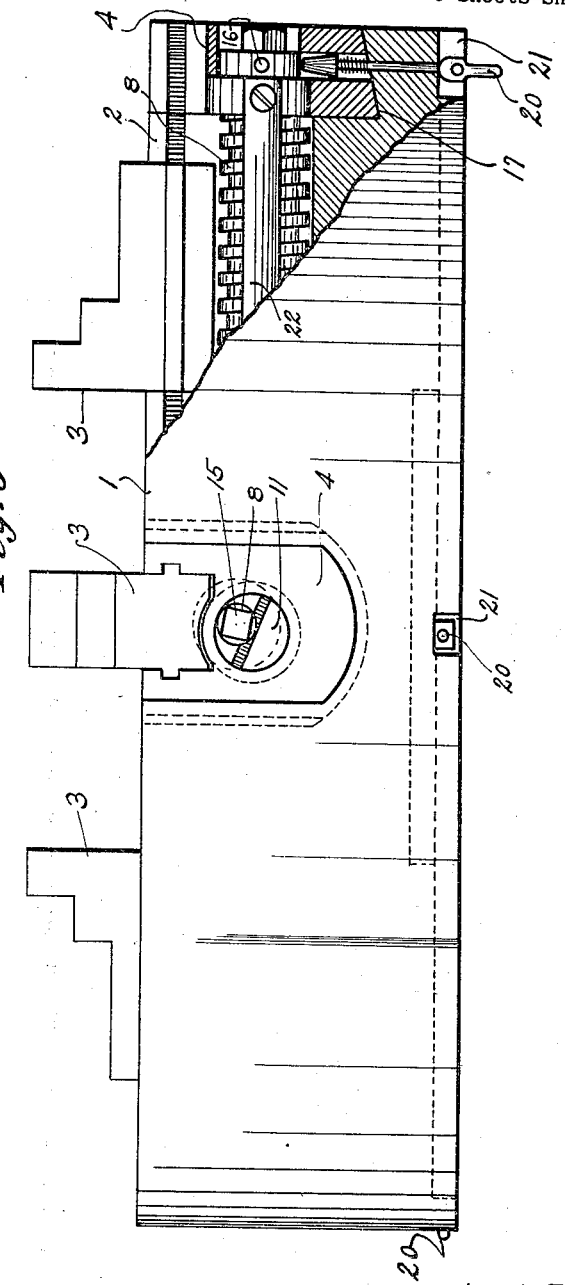

Aug. 5, 1924.
J. L. PHILLIPS
1,503,804
QUICK ADJUSTMENT CHUCK
Filed June 11, 1923     3 Sheets-Sheet 3
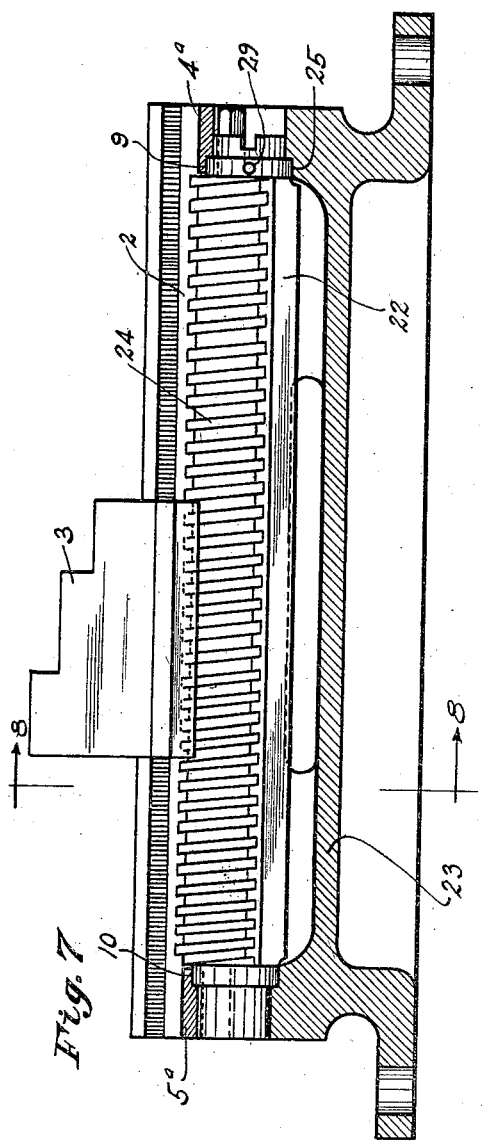
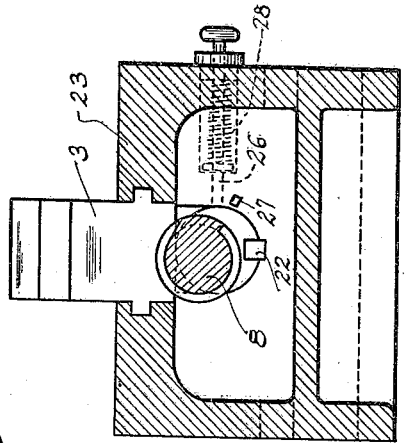
Inventor
Jas. L. Phillips
By
Attorney Patented Aug. 5, 1924.

1,503,804

UNITED STATES PATENT OFFICE.

JAMES L. PHILLIPS, OF ENSLEY, ALABAMA.

QUICK-ADJUSTMENT CHUCK.

Application filed June 11, 1923. Serial No. 644,611.

*To all whom it may concern:*

Be it known that I, JAMES L. PHILLIPS, a citizen of the United States of America, residing at Ensley, in the county of Jefferson and State of Alabama, have invented certain new and useful Improvements in Quick-Adjustment Chucks, of which the following is a specification.

My invention relates to a quick adjustment independent chuck, wherein a chuck jaw movable in a slot in the face plate is provided with means to engage or disengage it from the threads of its adjusting screw, the jaw when released from the threads being capable of free movement to and fro in the groove to permit of its quick adjustment.

My invention contemplates the utilization of a jaw adjusting screw eccentrically journaled in rotatable end bearings so mounted that by a partial rotation of the bearings the screw can be caused to engage or disengage the jaw.

A further advantage of my invention lies in the fact that I can provide a full circular end thrust bearing for the screw, thus to a large extent eliminating the weakest point of the present chuck jaw mounting.

My invention also contemplates the provision of means to connect the end bearings for joint rotation and of means which will engage and lock said bearings in the correct position for engaging the screw in operative relation with the chuck jaw.

My invention also contemplates the provision of thrust bearings which may be in whole or in part detachable from the face plate but which in either event present a complete circumferential bearing to take the end thrust on the screw.

My invention also comprises the novel details of construction and arrangements of parts, which in their preferred embodiments only are illustrated in the accompanying drawings, in which:—

Fig. 6 is a side elevation of a complete independent chuck with part of the face plate broken away to show the bearings adjusted to disengage the screw from its respective chuck jaw.

Fig. 7 shows my invention as applied to a standard chuck body having the upper half only of the end thrust bearing of its jaw screw formed by a detachable element.

Fig. 8 is a cross-sectional view taken on the line 8—8 of Fig. 7, showing a laterally disposed latch for the screw bearings.

Similar reference numerals refer to similar parts throughout the drawings.

Figure 1:
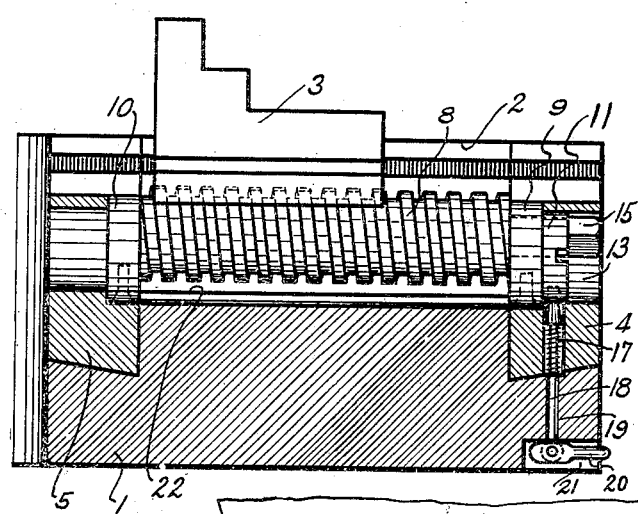
Fig. 1 is a cross-sectional view of a part of a face plate showing the chuck jaw in elevation and its adjusting screw latched in engagement therewith.
Figure 2:
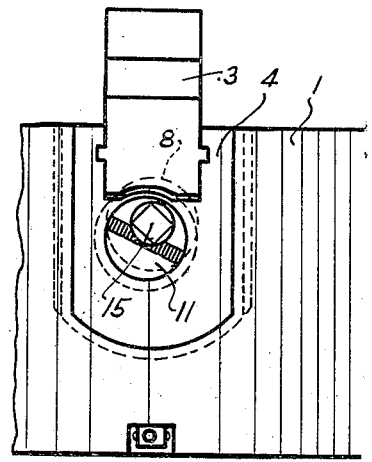
Figs. 2 and 3 are end and plan views respectively of Fig. 1, Fig. 2 showing the screw in lowered or jaw released position.
Figure 3:
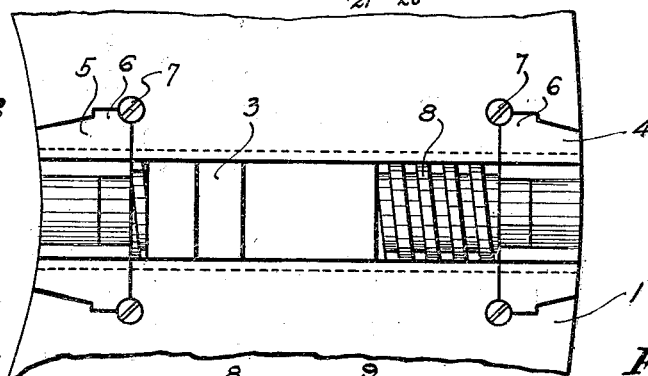
Figure 4:
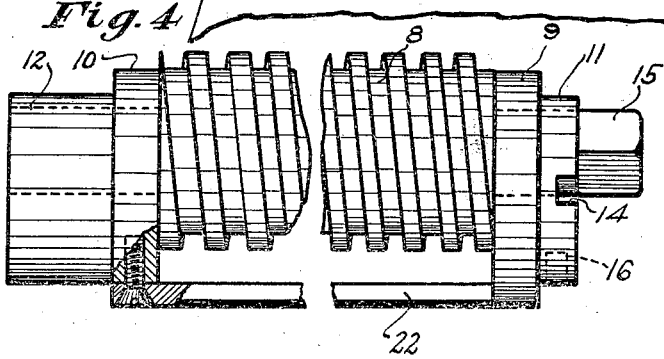
Fig. 4 is a detail view of the screw broken away with its ends mounted in their rotatable bearings.
Figure 5:
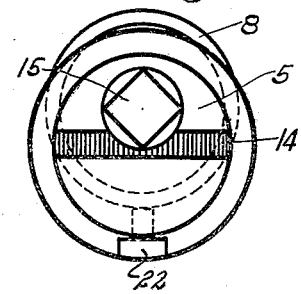
Fig. 5 is an end view of Fig. 4.

As illustrated in Figs. 1 to 6, I show a standard chuck body 1 having its face ground true to form a face plate in which are provided the desired number of T-slots or grooves 2 for the jaws 3 which are of any standard type, that shown being merely a conventional illustration. At each end of a slot I provide a seat to receive a pair of thrust bearings 4 and 5 which are preferably in the form of removable blocks tapered on both sides and at their bottoms so as to fit snugly into the seats provided therefor. These bearings are provided with shoulders 6 and are adapted to be held in position in the face plate by screws 7. The shoulders 6 take the end thrust from the chuck jaw adjusting screw 8. This screw 8 is formed in accordance with present standard practice and has reduced concentric cylindrical ends journaled eccentrically in circular bearings 9 and 10. These bearings 9 and 10 have reduced concentric cylindrical portions 11 and 12, respectively, the portion 12 being elongated and mounted to rotate in a bearing therefor in the block 5 and the shorted end 11 being mounted to rotate in a bearing 13 formed in the block 4. The bearing portion 11 is provided with a tool grip 14 in its outer end and the reduced end of the screw 8, which projects beyond the bearing portion 11, is squared to form a tool grip 15.

In the bearing portion 11 I provide a latch hole 16 opening radially therefrom and adapted to be engaged by a latch pin 17 having a spring-pressed shank 18 which extends below the block 4 through an opening 19 in the body 1 and is connected to a latch operating crank or lever 20, preferably housed, when in operating position, in a recess 21 in the bottom of the body. This latch pin is adapted to engage in the hole 16 and lock the bearing 11 in position which will cause the screw 8 to engage the bottom threads of the chuck jaw 3. In order that the bearings 9 and 10 may be rotated together like one part I connect them by a bar 22, suitably attached at each end to said bearings in which its ends are seated flush in countersunk recesses and connected by a screw or otherwise. The jaw slot provides ample clearance for this bar 22 to swing with the bearings 9 and 10 as they are turned by the engagement of a tool in the grip 14.

It will be at once apparent that the ends of the screw 8 have a full circular end thrust bearing against its end bearings 9 and 10 and that these bearings in turn have a full circular end thrust bearing against the blocks 4 and 5. This enables me to avoid a source of great wear and depreciation which results from taking the end thrust on half bearings. Obviously, the screw being eccentrically mounted in its circular end bearings 11 and 12, when the latter are rotated, in a counterclockwise direction as viewed in Fig. 2, the blocks 4 and 5 the screw can be raised into engagement with the chuck jaw threads and latched in this position, or it can be unlatched and swung down out of engagement with the jaw threads, thus permitting a quick adjustment of the latter. This released position of parts is shown in Fig. 6, where the connecting bar 22 is shown turned 90° clockwise from the position shown in Fig. 1, which has caused the adjusting screw 8 to be lowered sufficiently to become disengaged from the jaw threads, leaving the jaw 3 to be free to be quickly adjusted in its slot or groove.

In Figs. 7 and 8 I show a standard face plate 23 having the jaw 3 mounted therein and a co-acting screw 24 mounted in the manner already described in the bearings 9 and 10. In this design the ends of the T-head groove 2 in the face plate are open overhead and are formed below by a half circle shoulder 25 which engages and takes the end thrust of the lower half portion of the bearings 9 and 10. Blocks 4ª and 5ª are secured in the tops of the end bearing slots and are undercut to afford end thrust bearings for the upper half of the screw bearings, thus affording, as in the structure in Fig. 1, complete circular end thrust bearings for the screws. In this instance the screw latch 26 enters at the side of the face plate, the latch being normally pressed inwardly by a coil spring 28 and adapted to engage in a hole 29 formed in the shoulder 9 in such position that when the latch is engaged therein the screw will be held in mesh with the jaw threads. The face plate at its ends carries stops 27 adapted to engage connecting bar 22 and stop the screw in its released position.

In operation, having assembled the chuck jaw in the face plate slot and mounted the screw and its circular end bearings in the fixed end bearings in the face plate, by releasing the bearing latch the screw and its circular bearings can be turned sufficiently to disengage the screw from the chuck jaw which can then be moved quickly and easily to the desired adjustment, whereupon the screw bearings are turned back to operating position, bringing the screw 8 again into engagement with the jaw threads, after which the screw bearings are latched in operative position and the use of the chuck proceeds in normal manner.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

Having thus described my invention, what I claim as new and desire to secure by Letters Patent, is:—

1. In a quick adjustment independent chuck, a face place with a chuck jaw slot, a chuck jaw movable in said slot and having threads cut in an under portion thereof, a screw adapted to engage said threads and hold the jaw in adjusted positions, a full circular thrust bearing for each end of said screw, and means connecting said bearings for joint rotation, said screw being eccentrically journaled in said bearings whereby rotation of said bearings will quickly interengage and disengage said jaw and screw.

2. In a quick adjustment independent chuck, a face plate with a chuck jaw slot, a chuck jaw movable in said slot and having threads cut in an under portion thereof, a screw adapted to engage said threads and hold the jaw in adjusted positions, a full circular end thrust bearing for said screw, and means to move said screw eccentrically about the center of said bearing to quickly engage or release the jaw.

3. In a quick adjustment independent chuck, a face plate with a chuck jaw slot, a chuck jaw movable in said slot and having threads cut in its under portion, a screw adapted to engage said threads, circular end bearings in which said screw is eccentrically mounted, circular bearings in the face plate in which said screw bearings are rotatable, means connecting said screw bearings for joint movement whereby rotation of said bearings will quickly interengage and disengage said jaw and screw, and means to lock said bearings with the screw in jaw engaging position.

4. In a quick adjustment independent chuck, a face plate having a chuck jaw slot, a chuck jaw movable in the slot and having its under portion threaded, complete circular end bearings in the face plate, cylindrical bearings mounted to rotate in said face plate bearings, a jaw operating screw eccentrically journaled in said cylindrical bearings, a cross bar connecting said cylindrical bearings for joint rotation, and means to lock the cylindrical bearings with the screw in jaw engaging position, part at least of the complete circular bearings in the face plate being removable to permit the insertion of the screw with its cylindrical end bearings assembled thereon.

In testimony whereof I affix my signature.

JAMES L. PHILLIPS.

Witness:
NOMIE WELSH.